United States Patent
Shinkawa

(10) Patent No.: US 12,272,078 B2
(45) Date of Patent: Apr. 8, 2025

(54) INFORMATION PROCESSING DEVICE AND INFORMATION PROCESSING METHOD

(71) Applicant: OMRON Corporation, Kyoto (JP)

(72) Inventor: Daiki Shinkawa, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 343 days.

(21) Appl. No.: 18/003,598

(22) PCT Filed: Jun. 17, 2021

(86) PCT No.: PCT/JP2021/023104
§ 371 (c)(1),
(2) Date: Dec. 28, 2022

(87) PCT Pub. No.: WO2022/014252
PCT Pub. Date: Jan. 20, 2022

(65) Prior Publication Data
US 2023/0237676 A1    Jul. 27, 2023

(30) Foreign Application Priority Data

Jul. 15, 2020 (JP) .................................. 2020-121087

(51) Int. Cl.
*G06T 7/246* (2017.01)
*G06T 7/60* (2017.01)
*G06V 40/10* (2022.01)

(52) U.S. Cl.
CPC ................ *G06T 7/248* (2017.01); *G06T 7/60* (2013.01); *G06V 40/10* (2022.01); *G06T 2207/30196* (2013.01)

(58) Field of Classification Search
CPC .. G06V 40/10; G06T 2207/30196; G06T 7/60
See application file for complete search history.

(56) References Cited

U.S. PATENT DOCUMENTS

2007/0024704 A1* 2/2007 Lin .......................... G06T 7/80
348/135
2007/0070190 A1* 3/2007 Yin ................... G08B 13/19626
348/36

(Continued)

FOREIGN PATENT DOCUMENTS

CN    101866425 A  * 10/2010
JP    2015187880 A    10/2015

(Continued)

OTHER PUBLICATIONS

Z. Jian, X. Binhui and L. Jin, "The localization algorithm of human body based on omnidirectional vision," 2011 6th IEEE Joint International Information Technology and Artificial Intelligence Conference, Chongqing, China, 2011, pp. 172-176, doi: 10.1109/ITAIC.2011.6030303. (Year: 2011).*

(Continued)

*Primary Examiner* — Michael Robert Cammarata
(74) *Attorney, Agent, or Firm* — ROSSI, KIMMS & McDOWELL LLP

(57) ABSTRACT

An information processing apparatus includes a movable object detector that detects a movable object from a captured image captured with a fisheye camera, a human determiner that determines whether the movable object is a human by comparing a distance between two predetermined points on an outline of a movable object area including the movable object with a threshold range set based on a height of the human measured at a position of the movable object in the captured image, and a human detector that detects the human from the movable object area including the movable object determined as the human by the human determiner.

9 Claims, 10 Drawing Sheets

(56) References Cited

U.S. PATENT DOCUMENTS

| | | | | |
|---|---|---|---|---|
| 2013/0242074 A1* | 9/2013 | Sekiguchi | ............ | G06V 40/103 348/77 |
| 2014/0022394 A1* | 1/2014 | Bae | ........................ | G06V 20/52 348/169 |
| 2014/0193034 A1* | 7/2014 | Oami | ..................... | G06V 40/10 382/103 |
| 2014/0341472 A1* | 11/2014 | Fujimatsu | .............. | G06V 20/52 382/195 |
| 2019/0287212 A1* | 9/2019 | Yanagisawa | ........... | G06V 40/10 |
| 2022/0172374 A1* | 6/2022 | Tsuji | ........................ | H04N 7/18 |
| 2022/0366570 A1* | 11/2022 | Takahashi | .............. | H04N 7/183 |

FOREIGN PATENT DOCUMENTS

| | | | | |
|---|---|---|---|---|
| JP | 2018128885 | A | | 8/2018 |
| JP | 2019159739 | A | | 9/2019 |
| JP | 2020027463 | A | * | 2/2020 |
| JP | 2020086844 | A | | 6/2020 |
| WO | WO-2018230104 | A1 | * | 12/2018 ............. G08B 21/02 |
| WO | WO-2020179638 | A1 | * | 9/2020 |
| WO | WO-2021050369 | A1 | * | 3/2021 |

OTHER PUBLICATIONS

K. K. Delibasis, V. P. Plagianakos, T. Goudas and I. Maglogiannis, "Human segmentation and pose recognition in fish-eye video for assistive environments," 13th IEEE International Conference on BioInformatics and BioEngineering, Chania, Greece, 2013, pp. 1-5, doi: 10.1109/BIBE.2013.6701667. (Year: 2013).*

International Search Report issued in Intl. Appln. No. PCT/JP2021/023104 mailed Sep. 7, 2021. English translation provided.

Written Opinion issued in Intl. Appln. No. PCT/JP2021/023104 mailed Sep. 7, 2021. English translation provided.

* cited by examiner

Determine whether movable object is human based on its length

INFORMATION PROCESSING DEVICE AND INFORMATION PROCESSING METHOD

TECHNICAL FIELD

The present invention relates to an information processing apparatus and an information processing method.

BACKGROUND ART

In the market involving factory automation (FA), applications for factory optimization and safety improvement have been used for analyzing the working hours of workers at a factory or analyzing their movements using information about humans detected with image sensors. Human detection may be performed using deep learning, but such detection takes a lengthy time and may be unsuited for real time analysis. Patent Literature 1 describes a technique for reducing the processing load in detecting an object from a moving image by using, as a target detection area, a movable object area with a change between frames forming the moving image.

CITATION LIST

Patent Literature

Patent Literature 1: Japanese Unexamined Patent Application Publication No. 2018-128885

SUMMARY

Technical Problem

The target detection area limited to the movable object area may include, as objects to be analyzed, movable objects at a factory other than humans, including, for example, corrugated cardboard pieces being transported on a conveyor. The processing load for human detection is thus not reduced sufficiently. Object detection using information about the shape of an object may not accurately detect a human that changes the shape depending on its posture.

One or more aspects of the present invention are directed to a technique for detecting a human in real time with high accuracy.

Solution to Problem

The technique according to one or more aspects of the present invention has the structure described below.

An information processing apparatus according to a first aspect of the present disclosure includes a movable object detector that detects a movable object from a captured image captured with a fisheye camera, a human determiner that determines whether the movable object is a human by comparing a distance between two predetermined points on an outline of a movable object area including the movable object with a threshold range set based on a height of the human measured at a position of the movable object in the captured image, and a human detector that detects the human from the movable object area including the movable object determined as the human by the human determiner.

For a movable object being a human, the distance between the two predetermined points on the outline of the movable object area including the movable object refers to the distance corresponding to the height of the human. The distance may be hereafter also referred to as the length of the movable object. For a human for which an image is captured, the threshold range can be defined as the range of possible values for the height of the human at the position in the captured image. The information processing apparatus uses a limited target detection area for detecting a human with movable object detection, and also detects a human from a movable object limited to a human. This structure reduces the processing load for human detection and allows accurate detection of a human in real time.

The distance between the two predetermined points on the outline of the movable object area including the movable object may be a distance between first coordinates and second coordinates. The first coordinates may indicate a closest point or a farthest point in the movable object area from center coordinates indicating a center of the captured image, and the second coordinates may be different from the first coordinates and indicate a cross-point between the outline of the movable object area and a straight line including the center coordinates and the first coordinates. The information processing apparatus may calculate the length of the movable object with a simple method.

The distance between the two predetermined points on the outline of the movable object area including the movable object may be a distance between two points at which a straight line including coordinates of a center of gravity of the movable object area and the center coordinates of the captured image crosses the outline of the movable object area. Any change in the shape of a human as a movable object area in response to a change in the posture of the person, or for example, in response to the person extending its arm, causes the center of gravity of the movable object area to remain in the body of the person because the human arm is thinner than the body. Thus, the information processing apparatus can accurately obtain the height of the human by calculating the distance between two points at which a straight line extending through the coordinates of the center of gravity and the coordinates of the center of the captured image crosses the outline of the movable object area.

The threshold range may be set for an area of a plurality of areas included in the captured image. The captured image can include a human with a different shape depending on the position in the image. The information processing apparatus thus defines the length of the human expected in each of the plurality of areas as the threshold range. The information processing apparatus can thus accurately determine whether the detected movable object is a human.

The movable object detector may detect the movable object using background subtraction or interframe subtraction. The movable object detector may detect the movable object based on movement and a movement direction of an object captured in continuous frames of the captured image. The information processing apparatus detects a movable object and uses a target detection area for human detection limited to a movable object area including the detected movable object, thus reducing the load that may be increased by unintended human detection.

The information processing apparatus may further include an output unit that outputs information about the human detected by the human detector. The information processing apparatus may output the detection result of the human obtained by the human detector to, for example, a display, in real time to be presented to the user.

The information processing apparatus may further include an imaging unit that captures the captured image. The information processing apparatus may be integral with the imaging unit and can have a simple structure.

An information processing method according to a second aspect of the present invention is a method implementable with a computer. The method includes detecting a movable object from a captured image captured with a fisheye camera, determining whether the movable object is a human by comparing a distance between two predetermined points on an outline of a movable object area including the movable object with a threshold range set based on a height of the human measured at a position of the movable object in the captured image, and detecting the human from the movable object area including the movable object determined as the human.

Advantageous Effects

The technique according to the above aspects of the present invention allows accurate detection of a human in real time.

DETAILED DESCRIPTION

One or more embodiments according to one aspect of the present invention will now be described with reference to the drawings.

Example Use

Figure 1:
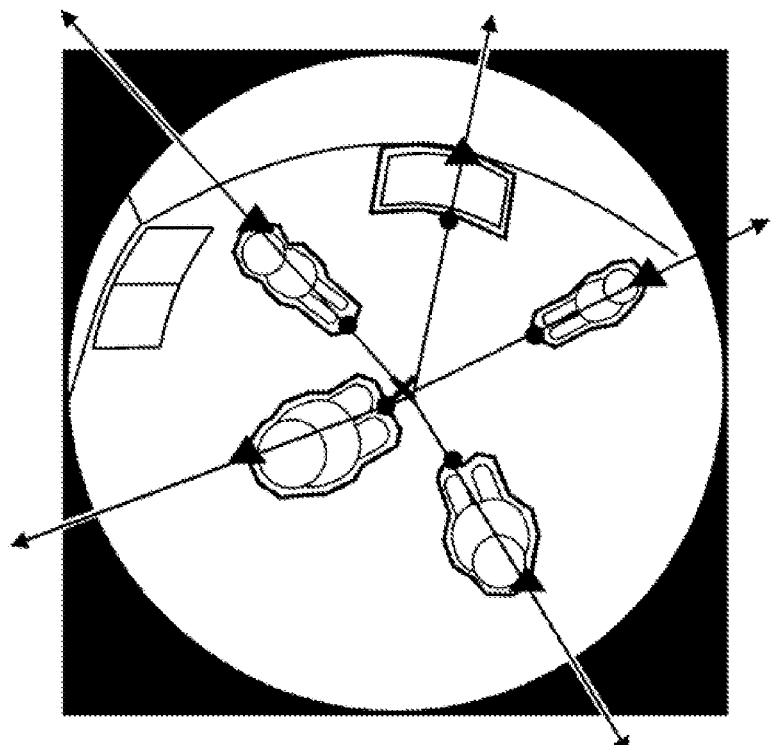
FIG. 1 is a schematic diagram describing an example use of an information processing apparatus according to an embodiment.
Figure 1:
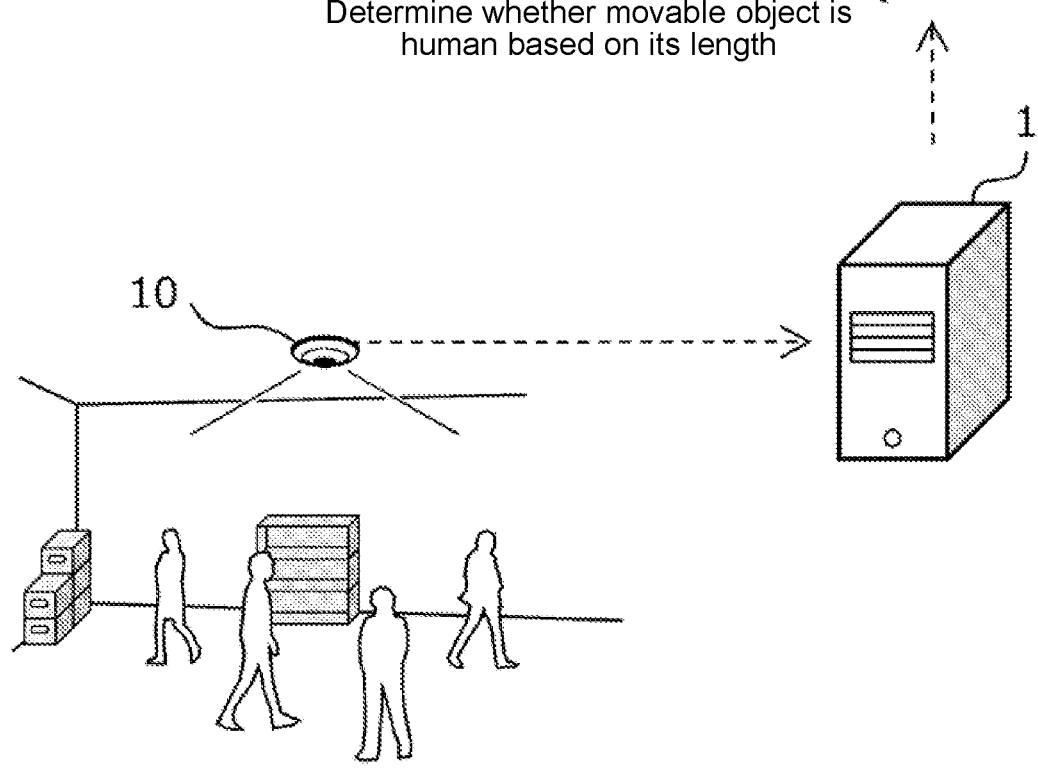

FIG. 1 is a schematic diagram describing an example use of an information processing apparatus according to an embodiment. An information processing apparatus 1 obtains a camera image (captured image) captured with a camera 10 (imaging unit). The camera 10 is, for example, an ultra wide-angle camera with a fisheye lens that can obtain image information for a wide area. A camera with a fisheye lens may also be referred to as a fisheye camera, an omnidirectional camera, or a full 360-degree spherical camera. The term "fisheye camera" is used herein.

An image captured with a fisheye camera can include a target object that may appear distorted depending on the position in the captured image. For example, an image of a human captured with a fisheye camera installed on the ceiling looking down the floor can include a person with the feet oriented toward the center and the head top oriented outward. A captured image can include a human to appear as a front image, a back image, or a side image at the periphery of the captured image, and as a top image at the center of the captured image.

The information processing apparatus 1 detects a movable object from the captured image obtained from the camera 10 and determines whether the movable object is a human. An image of a human captured with a fisheye camera shows distortion. The distance between the feet of the human and the head top (the height of the human) varies depending on the position in the captured image.

The distance between the feet and the head top expected at the position in the captured image is prestored as a threshold range in the information processing apparatus 1 for determining whether the detected movable object is a human. The information processing apparatus 1 may determine whether the movable object is a human by comparing the distance between two predetermined points (the length of the movable object) on the outline of the movable object area including the detected movable object with a threshold range predefined corresponding to the position in the captured image.

The information processing apparatus 1 analyzes the movable object area determined to be a human and detects the human. The information processing apparatus 1 may detect a human using a common object recognition algorithm. For example, such human detection may be performed using an algorithm using a discriminator that combines an image feature such as histogram of oriented gradients (HoG) or a Haar-like feature and boosting. Human detection may be performed using an algorithm based on human recognition using deep learning, such as region-based convolutional neural networks (R-CNN), Faster R-CNN, you only look once (YOLO), or a single shot multibox detector (SSD).

As described above, the information processing apparatus 1 may detect a movable object from a captured image and compare the detected movable object with the threshold range predefined corresponding to the position in the captured image to determine the likelihood of being a human. The information processing apparatus 1 detects a human in the captured image from the area limited to the movable object area including the movable object determined to be a human. Thus, the information processing apparatus 1 reduces the load for human detection.

Embodiments (Hardware Configuration)

Figure 2:
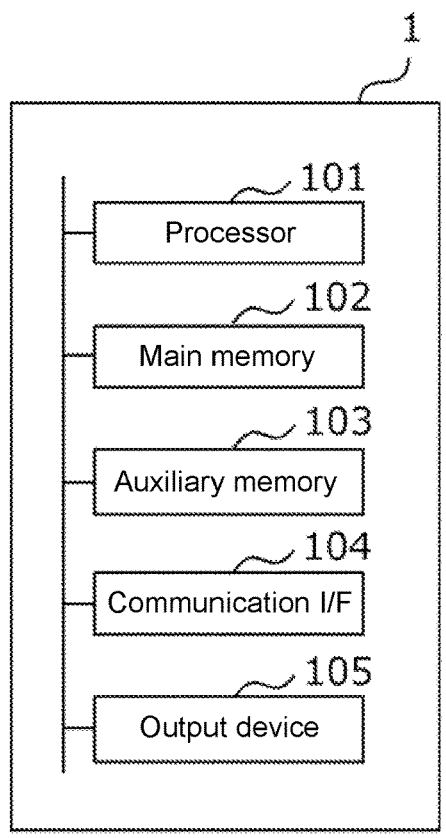
FIG. 2 is a schematic diagram of the information processing apparatus showing its hardware configuration.

The hardware configuration of the information processing apparatus 1 will now be described with reference to FIG. 2. FIG. 2 is a schematic diagram of the information processing apparatus 1 showing its hardware configuration. The information processing apparatus 1 includes a processor 101, a main memory 102, an auxiliary memory 103, a communication interface (I/F) 104, and an output device 105. The processor 101 loads a program stored in the auxiliary memory 103 into the main memory 102 and executes the program to achieve the functions of the functional components described with reference to FIG. 3. The communication interface 104 allows wired or wireless communication. The output device 105 is a device for output, such as a display.

The information processing apparatus 1 may be a general-purpose computer, such as a personal computer, a server computer, a tablet terminal, or a smartphone, or a built-in computer, such as an onboard computer. The information processing apparatus 1 may be implemented by, for example, distributed computing with multiple computer devices. At least one of the functional units may be implemented using a cloud server. At least one of the functional units of the information processing apparatus 1 may be implemented by a dedicated hardware device, such as an application-specific integrated circuit (ASIC) or a field-programmable gate array (FPGA).

The information processing apparatus 1 is connected to the camera 10 with a wire, such as a universal serial bus (USB) cable or a local area network (LAN) cable, or wirelessly, for example, through Wi-Fi, and receives image data captured with the camera 10. The camera 10 is an imaging device including an optical system including a lens and an image sensor, for example, a charge-coupled device (CCD) or a complementary metal-oxide semiconductor (CMOS).

The information processing apparatus 1 may be integral with the camera 10 (imaging unit). At least part of the processing performed by the information processing apparatus 1, for example, movable object detection or human determination for a captured image, may be performed by the camera 10. Further, results of human detection performed by the information processing apparatus 1 may be transmitted to an external device and presented to the user.

(Functional Components)

Figure 3:
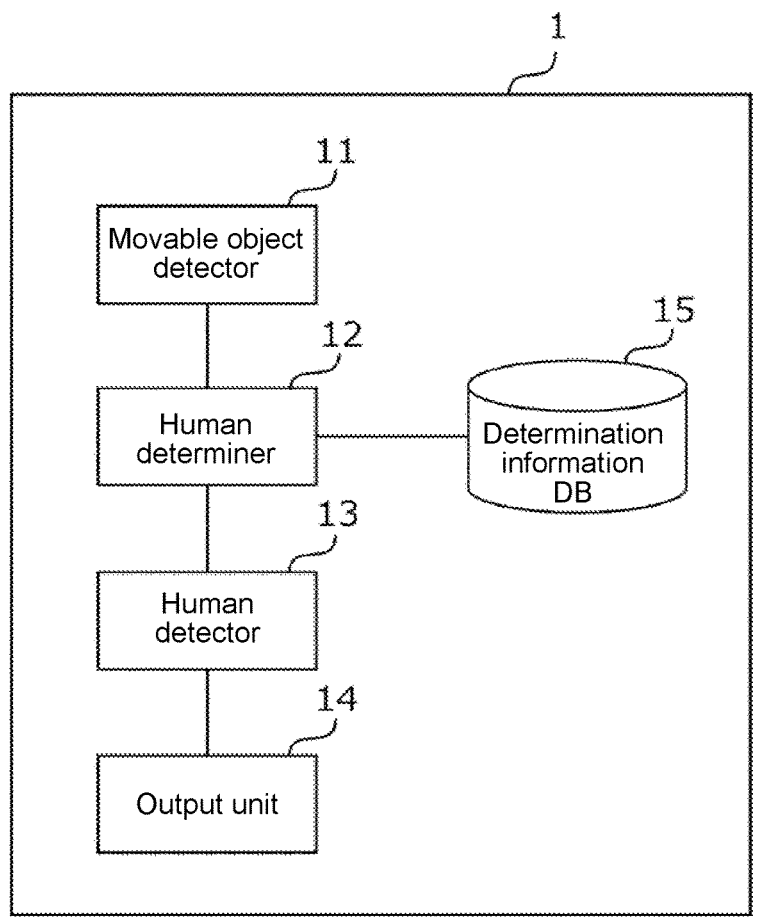
FIG. 3 is a functional block diagram of the information processing apparatus.

Example functional components of the information processing apparatus 1 will now be described with reference to FIG. 3. FIG. 3 is a functional block diagram of the information processing apparatus 1. The information processing apparatus 1 includes a movable object detector 11, a human determiner 12, a human detector 13, an output unit 14, and a determination information database 15 (determination information DB 15).

The movable object detector 11 detects a movable object from a captured image obtained from the camera 10. The movable object detector 11 may detect a movable object using, for example, background subtraction that detects an area with a change between a captured image and a prestored background image, or interframe subtraction that detects an area with a change between frames. A movable object may be detected using differences based on both background subtraction and interframe subtraction. A movable object may also be detected with a method using optical flow that estimates movement of an object and the direction of the movement using a part of an image common to continuous frames.

The human determiner 12 determines whether a movable object detected by the movable object detector 11 is a human. The human determiner 12 may determine whether the movable object is a human by, for example, comparing the length of the detected movable object with a threshold range defined based on the height of the human measured at the position of the movable object.

The human detector 13 detects (recognizes) a human from the area of the movable object determined to be a human by the human determiner 12. Human detection may be performed using a common object recognition technique, such as deep learning.

The output unit 14 outputs (displays) information about the detected human to the output device 105, which is, for example, a display. The output unit 14 may display the human detected by the human detector 13 by surrounding the human with a frame or by extracting the human from the captured image.

The determination information database 15 stores information used by the human determiner 12 to determine whether the movable object detected from the captured image is a human. The information used to determine whether the movable object is a human is, for example, the length (height) of a human expected in the captured image with the camera 10 in accordance with the distance from the center. The human determiner 12 may determine whether the movable object is a human by comparing the length of the movable object with the length of the human stored in the determination information database 15 as the threshold range.

(Human Detection Process)

Figure 4:
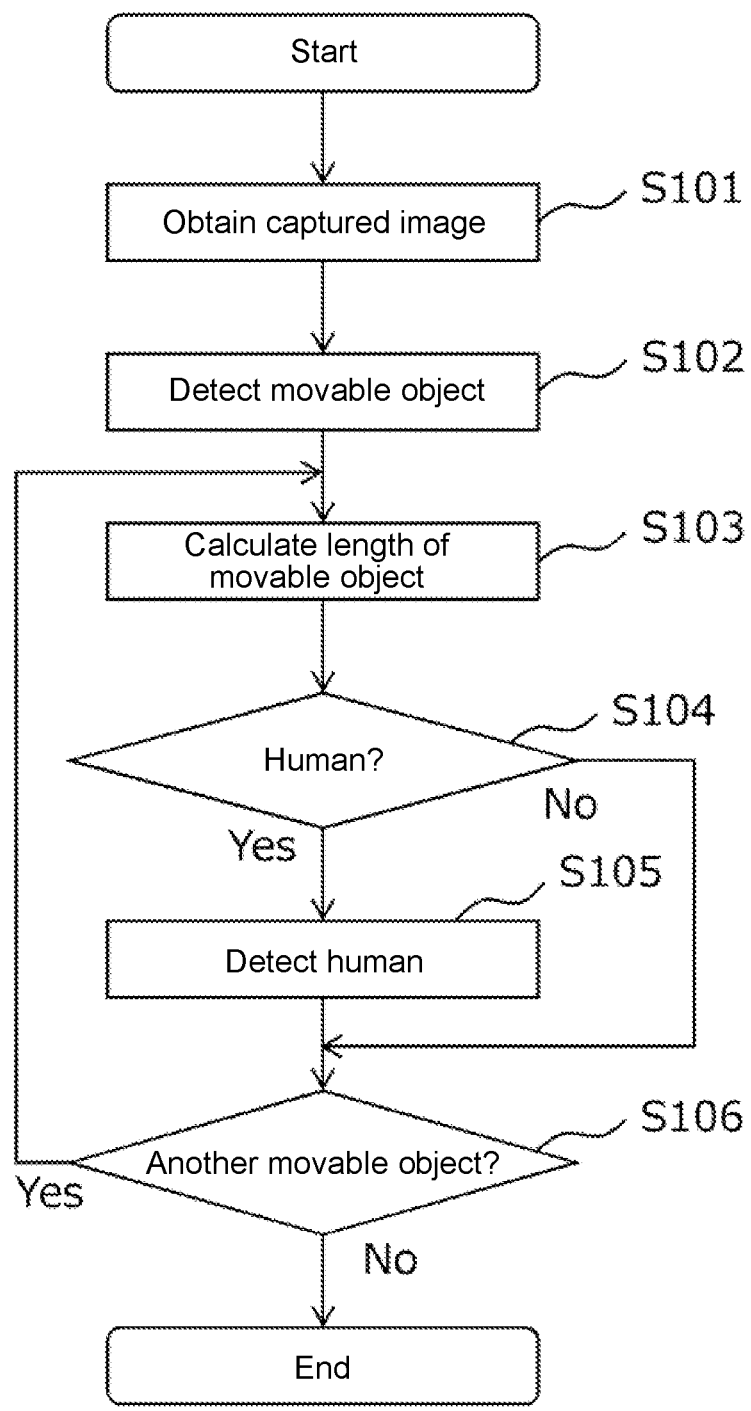
FIG. 4 is a flowchart of a human detection process.

A human detection process in the present embodiment will now be described with reference to FIG. 4. FIG. 4 is a flowchart of the human detection process. The human detection process is started when, for example, the camera 10 is turned on and the information processing apparatus 1 receives a captured image from the camera 10. The human detection process shown in FIG. 4 is performed for each frame of the captured image. In the flowchart in FIG. 4, the captured image is a single frame included in the captured image.

In S101, the movable object detector 11 obtains a captured image. The movable object detector 11 obtains the captured image from the camera 10 through the communication interface 104. For the information processing apparatus 1 integral with the camera (imaging unit), the movable object detector 11 obtains a captured image captured by the imaging unit.

In S102, the movable object detector 11 detects a movable object from the captured image obtained in S101. The movable object in the captured image is detected with the method described below with reference to FIG. 5. The information processing apparatus 1 includes a background image 501 captured without any movable object such as a human stored in, for example, the auxiliary memory 103. The movable object detector 11 extracts an area with a difference between the captured image 502 and the background image 501 as a movable object area. In an output image 503 shown in FIG. 5, frames each surround and indicate the corresponding extracted movable object area. The output image 503 is an example image in which a shelf, other than a human, is detected as a movable object due to its positional change or erroneous recognition.

Figure 5:
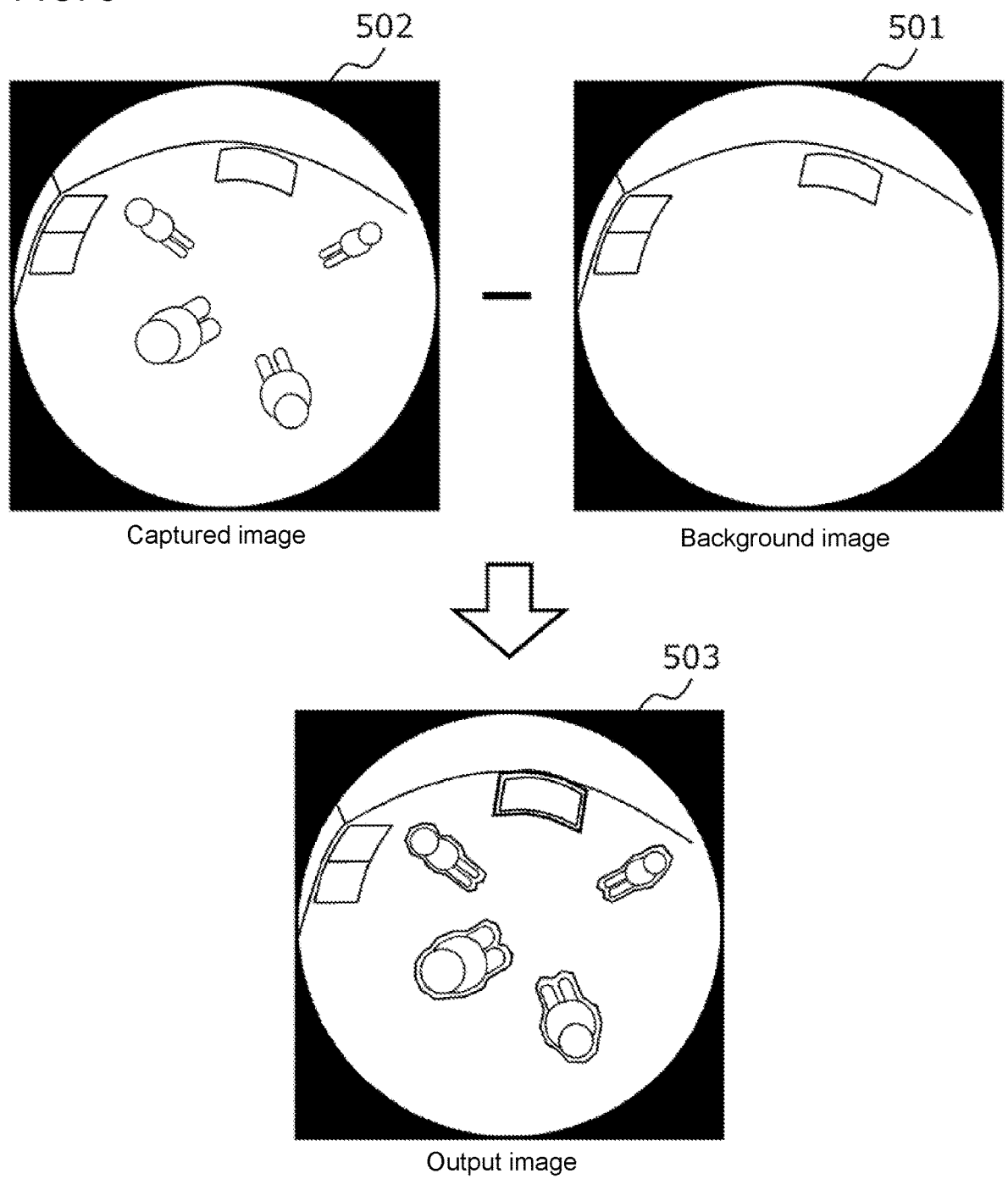
FIG. 5 is a diagram describing movable object detection.

A method for detecting a movable object is not limited to the example described with reference to FIG. 5. The method may use optical flow to estimate the movement of an object and the direction of the movement using a part of an image common to continuous frames.

When multiple movable objects are detected in S102, the processing from S103 to S105 is repeated for each movable object.

Figure 6:
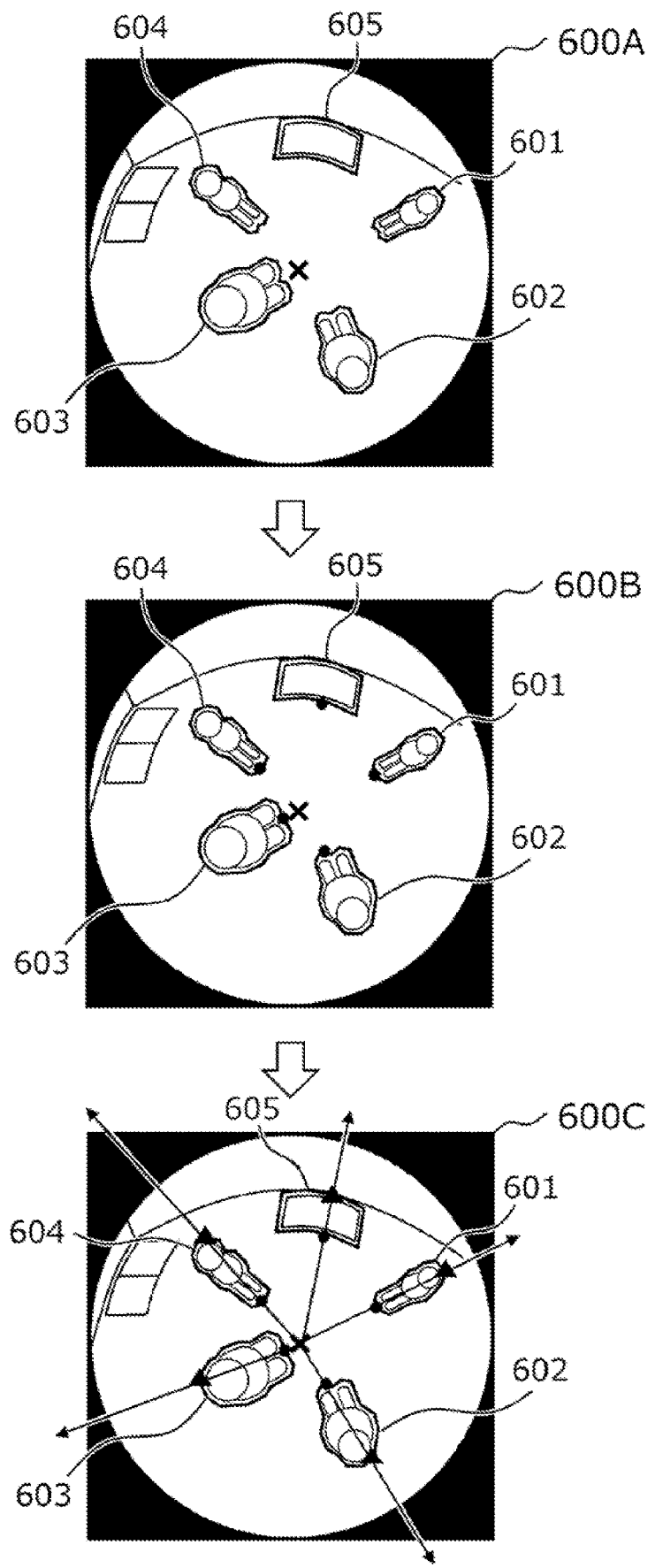
FIG. 6 is a diagram describing calculation of the length of a movable object in a first example.
Figure 7A:
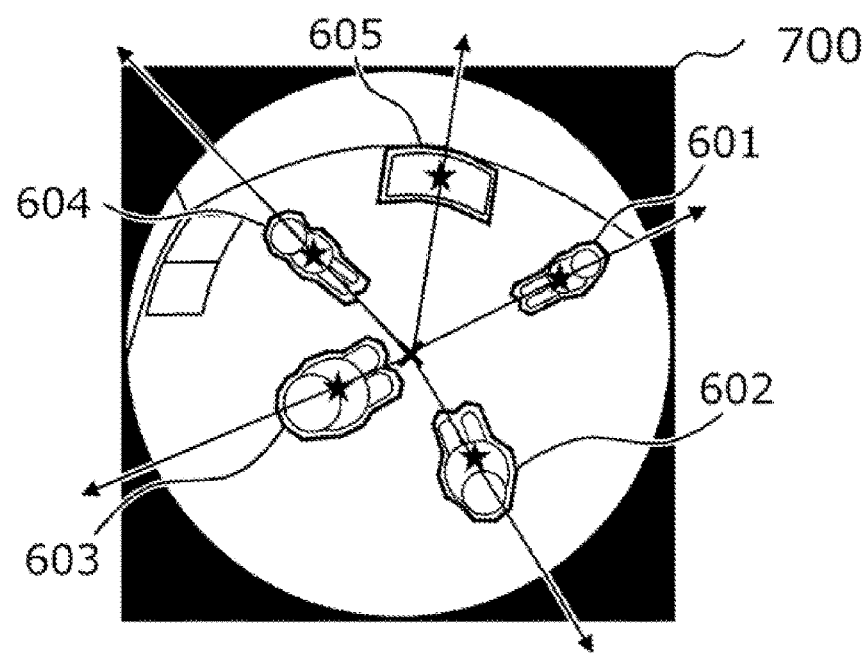
FIGS. 7A and 7B are diagrams each describing calculation of the length of a movable object in a second example.
Figure 7B:
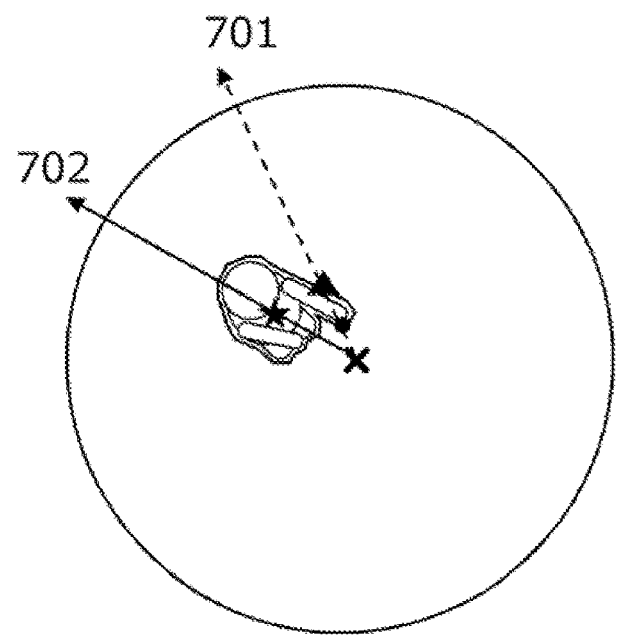

In S103, the human determiner 12 calculates the length of the movable object to be determined. With reference to FIGS. 6, 7A, and 7B, two examples now be described for calculating the length of a movable object detected in an image captured with the fisheye camera (camera 10).

In the example of FIG. 6, when the movable object is a person, the human determiner 12 calculates the distance between the coordinates of the position expected to be the feet and the position expected to be the head top as the length of the movable object. In the example of FIG. 7A, the human determiner 12 calculates the distance between two points at which the straight line connecting the coordinates of the center of gravity of the movable object and the coordinates of the center of the captured image crosses the outline of the movable object area as the length of the movable object.

FIG. 6 is a diagram describing calculation of the length of a movable object in a first example. An image 600A shows movable object areas 601 to 605 each including a movable object detected in S102. The captured image has the center indicated by the mark x. As in the image 600A, an image of a human captured with a fisheye camera includes the feet oriented toward the center and the head top oriented outward.

An image 600B including the movable object being a human includes the coordinates of the position expected to be the feet of each person (hereafter referred to as the foot coordinates) indicated by a circle. The human determiner 12 may, for example, obtain the coordinates closest to the coordinates of the center of the captured image (hereafter referred to as the center coordinates) among the movable object areas and use the obtained coordinates as the foot coordinates.

An image 600C including a movable object being a human includes the coordinates of the position expected to be the head top of each person (hereafter referred to as the head top coordinates) indicated by a triangle. The human determiner 12 may, for example, obtain the coordinates of another cross-point between the straight line including the foot coordinates and the center coordinates and the outline of the movable object area and use the obtained coordinates as the head top coordinates. The human determiner 12 may also obtain the coordinates farthest from the center coordinates among the movable object areas and use them as the head top coordinates.

The human determiner 12 calculates the distance between the obtained foot coordinates and the head top coordinates as the length of the movable object (the height of the human). Although the example of FIG. 6 shows how to obtain the foot coordinates first, the human determiner 12 may obtain the head top coordinates first. More specifically, the human determiner 12 may obtain the coordinates farthest from the head top coordinates among the movable object areas. The human determiner 12 may also obtain the coordinates of another cross-point between the straight line including the head top coordinates and the center coordinates and the outline of the movable object area and use them as the foot coordinates.

FIGS. 7A and 7B are diagrams each describing calculation of the length of a movable object in a second example. An image 700 in FIG. 7A shows movable object areas 601 to 605 each including a movable object detected in S102. The captured image has the center indicated by the mark x. The image 700 includes the coordinates of the center of gravity of each movable object area (hereafter referred to as the center-of-gravity coordinates) indicated with a star.

The human determiner 12 calculates the distance between the two points at which the straight line connecting the center-of-gravity coordinates and the center coordinates crosses the outline of the movable object area as the length of the movable object. In the second example, the human determiner 12 may calculate the height of a human more accurately when the person is extending an arm.

For example, as shown in FIG. 7B, when the tip of the hand is closest to the center of the captured image, the method in the first example may erroneously recognize the tip of the hand as the feet. In this case, the straight line connecting the center coordinates and the coordinates of the tip of the hand may not pass through the head top of the human as indicated by a dotted line 701.

In contrast, the center of gravity of the movable object area typically remains in the body area because the hand and arm portions of the person are thinner than the body area although the person is extending an arm. In this case, a straight line 702 connecting the center coordinates and the center-of-gravity coordinates of the movable object area passes through the head top of the human. Thus, the human determiner 12 can accurately calculate the height of the human with the method in the second example using the center of gravity of the movable object area, independently of the posture of the person.

Figure 8:
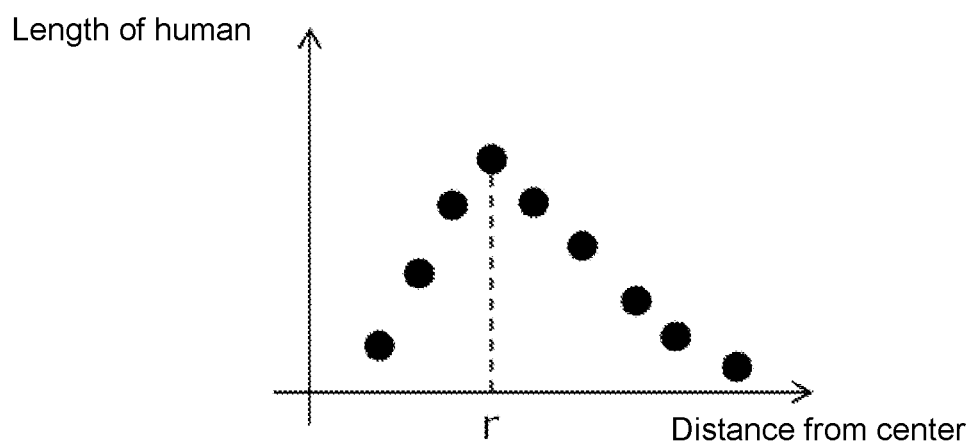
FIG. 8 is a graph showing the length of a human as a function of the distance from the center.

In S104 in FIG. 4, the human determiner 12 determines whether the movable object is a human by comparing the length of the detected movable object obtained in S103 with the threshold range predefined corresponding to the position of the movable object in the captured image. Referring now to FIGS. 8 to 10, the threshold range for determining whether the movable object is a human will now be described.

Referring to FIG. 8, the length of a human in the captured image captured with a fisheye camera will now be described. FIG. 8 is a graph showing the length of a human as a function of the distance from the center. The horizontal axis indicates the distance from the center of the captured image. The distance from the center to the movable object may be, for example, the distance between the center of gravity of the movable object area and the center of the captured image. The vertical axis indicates the length (height) of a human in the captured image.

A human standing immediately below the fisheye camera installed on the ceiling has its feet and head top positioned at the center of the imaging range, and has the length of zero in the captured image. As the human moves away from the center of the imaging range, the length of the human increases. In the example shown in FIG. 8, the length of the human decreases as the distance from the center of the human exceeds the value r. In the image captured with the fisheye camera, the length of the human increases as the human moves away from the center, but gradually decreases as the distance from the center exceeds a specific value.

Figure 9A:
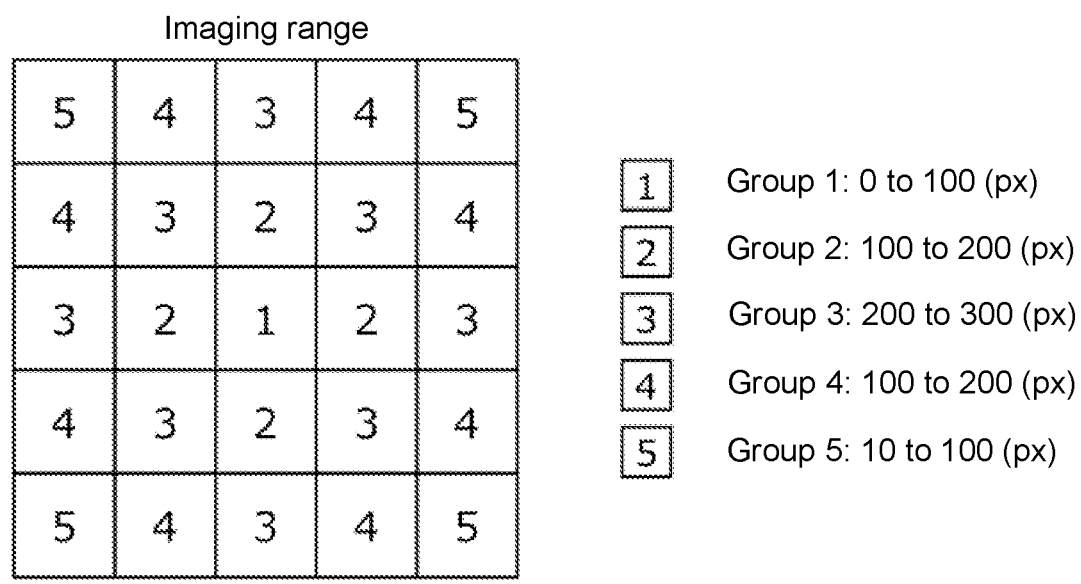
FIGS. 9A and 9B are diagrams of example thresholds defined for the respective areas of an imaging range.
Figure 9B:
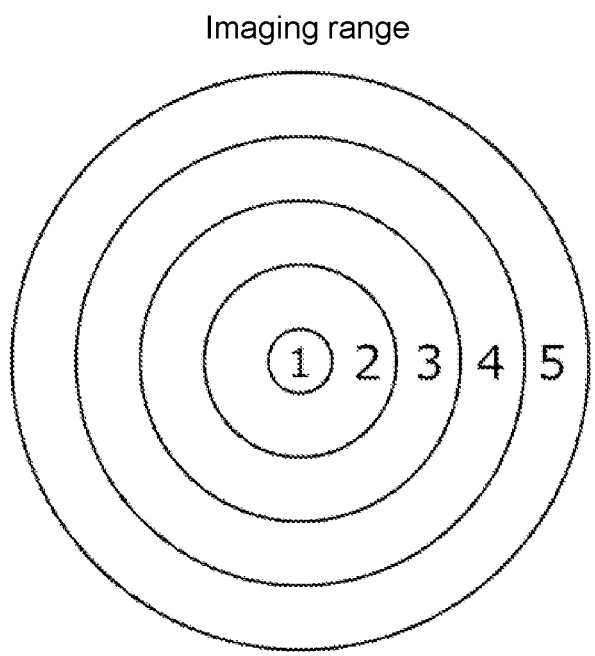
Figure 10:
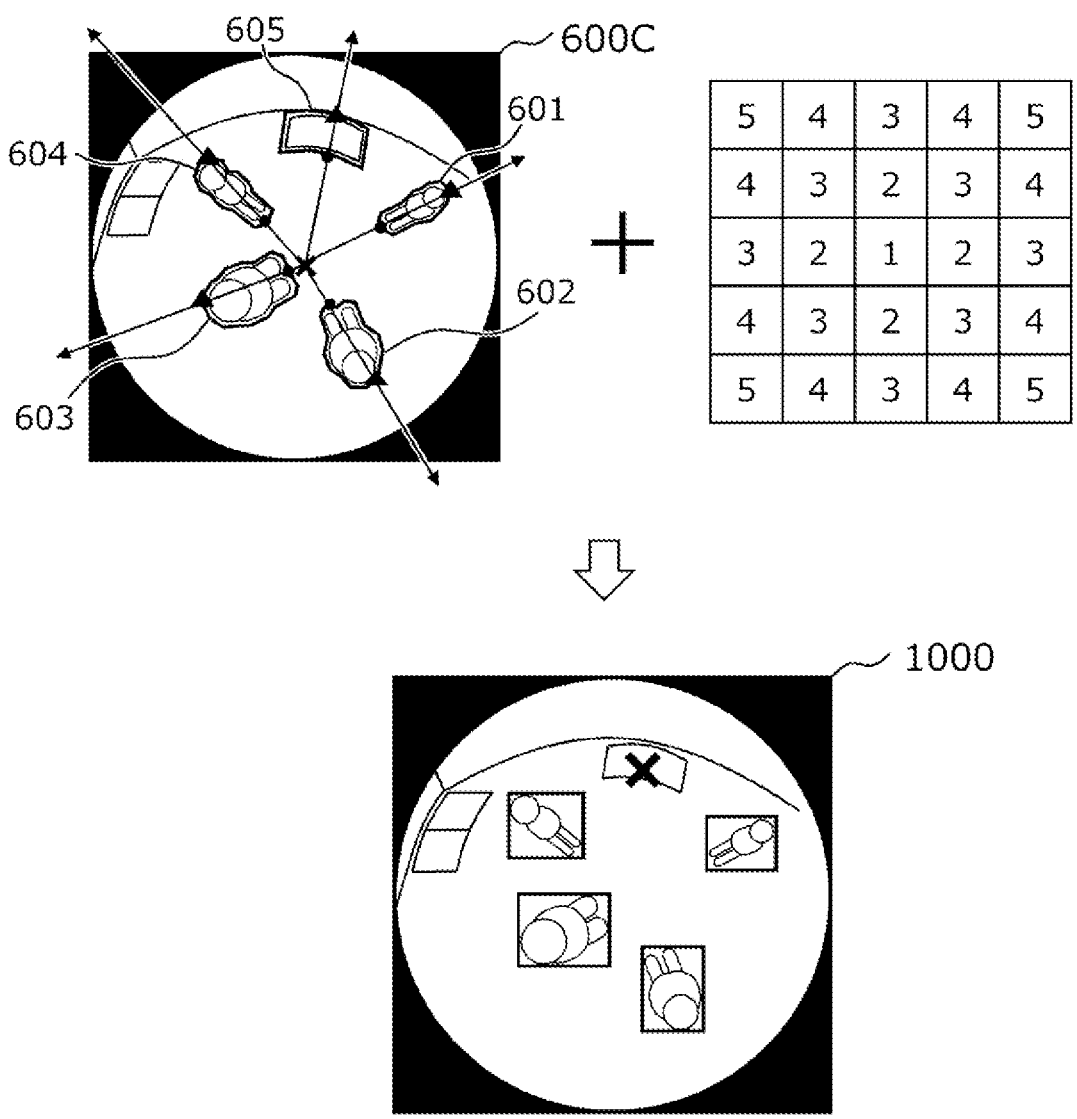
FIG. 10 is a diagram showing example determination as to whether a movable object is a human.

Referring to FIGS. 9A and 9B, the threshold range for the length of the human predefined corresponding to the position of the movable object in the captured image will now be described. FIGS. 9A and 9B are diagrams of example thresholds defined for the respective areas of an imaging range. The imaging range shown in the example of FIG. 9A is an example plan of a full 360-degree spherical imaging range captured with a fisheye camera. The imaging range is divided into multiple areas in groups 1 to 5 in accordance with the distance from the center. For each group, a range of expected human lengths is assigned.

The threshold range shown in FIG. 9A is an example range of thresholds defined based on data indicating the length of a human measured using an image with 1600× 1200 pixels (px) captured with a fisheye camera installed at a height of 3 m.

In an area in the group 1 at the center of the imaging range, the length of a human is expected to be between 0 to 100 px. In areas in the group 2 adjacent to the area in the group 1, the length of a human is greater than in the group 1 and expected to be 100 to 200 px. In areas in the group 3 adjacent to and further outside the areas in the group 2, the length of a human is greater than in the group 2 and expected to be 200 to 300 px.

Shorter human lengths are assigned to areas outward from the areas in the group 3. In areas in the group 4 adjacent to and further outside the areas in the group 3, the length of a human is less than in the group 3 and expected to be 100 to 200 px. In areas in the group 5 adjacent to and further outside the areas in the group 4, the length of a human is less than in the group 4 and expected to be 10 to 100 px.

Thus, the imaging range is divided into multiple areas, and information about the length of a human expected in each area is predefined in accordance with the installation position of the camera 10 and the number of pixels in the captured image. The information about the defined length of a human (threshold range) is prestored in the determination information database 15. The human determiner 12 may determine whether the movable object is a human by comparing the length of the movable object obtained in S103 with the information about the threshold range stored in the determination information database 15.

When no object larger than a human is in the imaging range, the upper limit may not be set for the threshold range for each group. In this case, the human determiner 12 may determine that a movable object larger than the lower limit of the threshold range illustrated in FIG. 9A is a human.

Although FIG. 9A shows an example of dividing an imaging range into multiple rectangular areas and defining a threshold range for each area, the imaging range is not limited to this. As shown in FIG. 9B, the imaging range indicated with the circle may be divided by multiple concentric circles, with each area defining the threshold range for the length of a human.

Referring now to FIG. 10, a method for determining whether a movable object is a human will now be described using the threshold range described in FIG. 9A. FIG. 10 is a diagram showing an example determination as to whether a movable object is a human. The human determiner 12 calculates the length of a movable object by obtaining the foot coordinates and the head top coordinates for the detected movable object area, as described using the image 600C in FIG. 6.

The human determiner 12 also determines the group including the movable object area within the imaging range. For example, the human determiner 12 may determine the group including the movable object area based on the head top coordinates in the movable object area. The human determiner 12 may determine the group including the area including the movable object based on the position of the foot coordinates, the center-of-gravity coordinates, or a midpoint between the foot coordinates and the head top coordinates, instead of determining based on the head top coordinates.

The human determiner 12 obtains the threshold range for the group including the movable object area from the determination information database 15. The human determiner 12 compares the length of the movable object calculated in S103 with the threshold range obtained from the determination information database 15. The human determiner 12 determines that the detected movable object is a human when the length of the movable object is within the threshold range.

In the example of FIG. 10, the movable object area 605 included in the image 600C includes a movable object with a calculated length not within the threshold range. The movable object area 605 is thus determined not to be a human. An image 1000 includes the mark x indicating that the movable object area 605 has not been determined to be a human. The image 1000 includes rectangles surrounding the movable object areas 601 to 604 to indicate that these movable object areas have been determined to be humans.

In S104 in FIG. 4, when the human determiner 12 determines that the detected movable object is a human (Yes in S104), the processing advances to S105. When the human determiner 12 does not determine that the movable object is a human (No in S104), the processing advances to S106.

In S105, the human detector 13 recognizes and detects a human from the movable object area including the movable object determined to be a human in S104. The human detector 13 can detect a human using a typical object recognition algorithm.

Figure 11A:
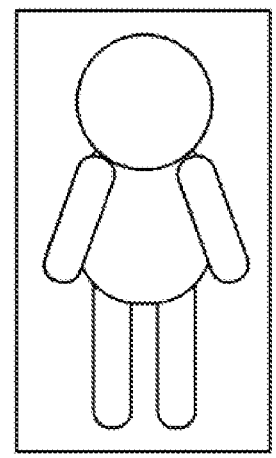
FIGS. 11A and 11B are diagrams each describing a method for detecting a human from a movable object area.
Figure 11B:
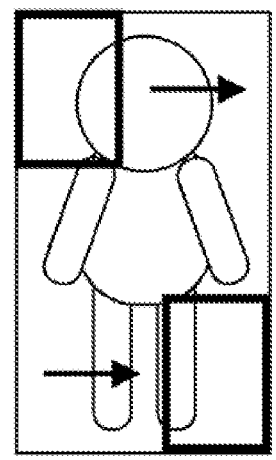

Referring now to FIGS. 11A and 11B, a method for detecting a human from a movable object area using a CNN will now be described. FIG. 11A shows an example of a movable object detected based on a difference in the movable object between multiple frames in S102. The human detector 13 can detect a human by inputting a movable object area detected based on the difference in the movable object directly into the CNN.

For detecting a movable object based on the difference in the movable object, the movable object area is detected from areas included in multiple frames. Thus, the human may be detected to be larger than its actual size as shown in FIG. 11A. As shown in FIG. 11B, the human detector 13 may thus detect a human based on divided areas obtained using windows sequentially in the movable object area and input into the CNN. Searching the movable object area using windows allows the human detector 13 to perform accurate detection for the length of a human.

The human detector 13 may recognize a human from a movable object area using a discriminator that combines an image feature such as a HoG or a Haar-like feature and boosting. In this case as well, the determination as to whether a movable object is a human may be performed for the entire movable object area, or the human with any length within the movable object area may be detected and recognized by searching the movable object area using windows as in the example of FIG. 11B.

In step S106 in FIG. 4, the human determiner 12 determines whether another movable object is detected and is yet to undergo determination for human detection in S102. When another movable object is to undergo determination (Yes in S106), the processing returns to S103. When no other movable object is detected (No in S106), the human detection process shown in FIG. 4 ends.

When the human detection process ends, the output unit 14 superimposes, for example, a rectangular frame indicating a detected human on the captured image and outputs the image to, for example, a display.

(Effects)

In the above embodiment, the information processing apparatus 1 detects a movable object from a captured image and determines whether the detected movable object is a human. When the movable object is determined to be a human, the information processing apparatus 1 detects the human from the movable object area including the detected movable object using, for example, deep learning. Thus, the information processing apparatus 1 uses the target detection area for detecting a human limited to the movable object area including the movable object determined to be a human, and reduces the load of human recognition with, for example, deep learning, thus allowing accurate detection of a human in real time.

When determining whether the detected movable object is a human, the information processing apparatus 1 compares the length of the movable object with the threshold range predefined corresponding to the position of the movable object in the captured image. An image captured with a fisheye camera can include a captured human that may appear distorted depending on the position in the captured image. An expected length of a human varies depending on the position of the human in the captured image. The threshold range for determining whether a movable object is a human is thus defined corresponding to the position in the captured image. The information processing apparatus 1 uses the threshold range defined corresponding to the position or an area in the captured image, and thus can accurately determine whether the detected movable object is a human by reflecting the characteristics of the captured image captured with the fisheye camera.

Others

The above embodiment describes exemplary structures according to one or more aspects of the present invention. The present invention is not limited to the specific embodiment described above, but may be modified variously within the scope of the technical ideas of the invention.

In the above embodiment, the threshold range for determining whether a movable object is a human is predefined for each of multiple areas into which the imaging range is divided. However, the embodiment is not limited to this structure. For example, the threshold range for determining whether a movable object is a human may be calculated by a predetermined formula in accordance with the distance from the center of the captured image to the center of gravity of the movable object area.

The threshold range for determining whether a movable object is a human may be defined to a range of different values in accordance with the gender or age group of a human to be a main imaging target.

APPENDIX 1

(1) An information processing apparatus (1), comprising:
a movable object detector (11) configured to detect a movable object from a captured image captured with a fisheye camera;
a human determiner (12) configured to determine whether the movable object is a human by comparing a distance between two predetermined points on an outline of a movable object area including the movable object with a threshold range set based on a height of the human measured at a position of the movable object in the captured image; and
a human detector (13) configured to detect the human from the movable object area including the movable object determined as the human by the human determiner.

(2) An information processing method implementable with a computer, the method comprising:
(S102) detecting a movable object from a captured image captured with a fisheye camera;
(S103, S104) determining whether the movable object is a human by comparing a distance between two predetermined points on an outline of a movable object area including the movable object with a threshold range set based on a height of the human measured at a position of the movable object in the captured image; and
(S105) detecting the human from the movable object area including the movable object determined as the human.

REFERENCE SIGNS LIST

1: information processing apparatus, 10: camera, 11: movable object detector, 12: human determiner, 13: human detector, 14: output unit, 15: determination information database

The invention claimed is:

1. An information processing apparatus, comprising:
a movable object detector configured to detect a movable object from a captured image captured with a fisheye camera;
a human determiner configured to determine whether the movable object is a human by comparing a distance between two predetermined points on an outline of a movable object area including the movable object with a threshold range set based on a height of the human measured at a position of the movable object in the captured image; and
a human detector configured to detect the human from the movable object area including the movable object determined as the human by the human determiner,
wherein the distance between the two predetermined points on the outline of the movable object area including the movable object is a distance between two points at which a straight line including coordinates of a center of gravity of the movable object area and the center coordinates of the captured image crosses the outline of the movable object area.

2. The information processing apparatus according to claim 1, wherein
the distance between the two predetermined points on the outline of the movable object area including the movable object is a distance between first coordinates and second coordinates, the first coordinates indicate a closest point or a farthest point in the movable object area from center coordinates indicating a center of the captured image, and the second coordinates are different from the first coordinates and indicate a cross-point between the outline of the movable object area and a straight line including the center coordinates and the first coordinates.

3. The information processing apparatus according to claim 1, wherein
the threshold range is set for an area of a plurality of areas included in the captured image.

4. The information processing apparatus according to claim 1, wherein
the movable object detector detects the movable object using background subtraction or interframe subtraction.

5. The information processing apparatus according to claim 1, wherein
the movable object detector detects the movable object based on movement and a movement direction of an object captured in continuous frames of the captured image.

6. The information processing apparatus according to claim 1, further comprising:
an output unit configured to output information about the human detected by the human detector.

7. The information processing apparatus according to claim 1, further comprising:
an imaging unit configured to capture the captured image.

8. An information processing method implementable with a computer, the method comprising:
detecting a movable object from a captured image captured with a fisheye camera;
determining whether the movable object is a human by comparing a distance between two predetermined points on an outline of a movable object area including the movable object with a threshold range set based on a height of the human measured at a position of the movable object in the captured image; and detecting the human from the movable object area including the movable object determined as the human,
wherein the distance between the two predetermined points on the outline of the movable object area including the movable object is a distance between two points at which a straight line including coordinates of a center of gravity of the movable object area and the center coordinates of the captured image crosses the outline of the movable object area.

9. A non-transitory computer-readable medium storing a program for causing a computer to perform:
detecting a movable object from a captured image captured with a fisheye camera;
determining whether the movable object is a human by comparing a distance between two predetermined points on an outline of a movable object area including the movable object with a threshold range set based on a height of the human measured at a position of the movable object in the captured image; and
detecting the human from the movable object area including the movable object determined as the human,
wherein the distance between the two predetermined points on the outline of the movable object area including the movable object is a distance between two points at which a straight line including coordinates of a center of gravity of the movable object area and the center coordinates of the captured image crosses the outline of the movable object area.

* * * * *